UNITED STATES PATENT OFFICE.

FRITZ ULLMANN, OF CHARLOTTENBURG, GERMANY, ASSIGNOR TO ACTIEN GESELLSCHAFT FÜR ANILIN FABRIKATION, OF BERLIN, GERMANY.

HALOGENIZED CARBOXYLIC ACID OF THE PHENYLAMINOANTHRAQUINONE SERIES.

993,915.     Specification of Letters Patent.     Patented May 30, 1911.

No Drawing.     Application filed March 13, 1911. Serial No. 614,209.

*To all whom it may concern:*

Be it known that I, FRITZ ULLMANN, a subject of the King of Bavaria, residing at Charlottenburg, near Berlin, Germany, my post-office address being 15/16 Schillerstrasse, Charlottenburg, near Berlin, Germany, have invented certain new and useful Improvements in New Halogenized Carboxylic Acids of the Phenylaminoanthraquinone Series, of which the following is a specification.

According to my present invention new halogenized carboxylic acids of the phenylamino-anthraquinone series are obtained, which contain a halogen-atom and which are very valuable parent materials for the manufacture of vat dyes as well as of intermediate products for such dyes.

My invention is based on the observation that alpha-chloroanthraquinone reacts with a halogenized anthranilic acid forming thus a halogenized alpha-anilidoanthraquinone carboxylic acid; the reaction may be represented, for instance, by the following equation using a bromo-anthranilic acid:

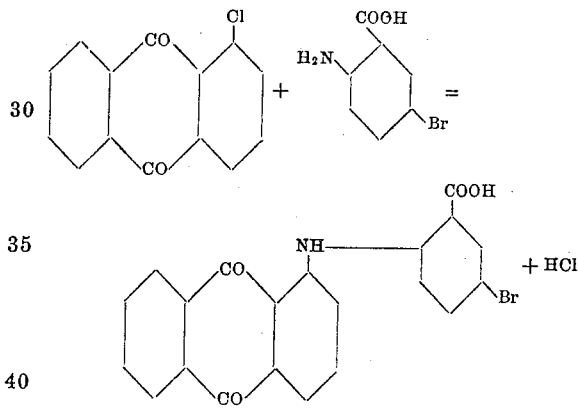

In performing the reaction a substance capable of absorbing the hydrochloric acid formed during the reaction and a body possessing a so-called catalytic function are added.

The following example illustrates my invention, the parts being by weight: 24.2 parts of alpha-chloroanthraquinone and 22 parts of bromoanthranilic acid

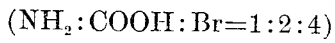

are dissolved in 462 parts of amyl alcohol; 20 parts of potassium acetate, 1 part of copper acetate and 1 part of copper are added and the mixture is heated in the oil bath at 160° C. while stirring, whereby the mass soon becomes violet. When the change is complete, the mass is distilled in steam and the residue is extracted first with dilute hydrochloric acid and then with toluene.

The new alpha-bromoanilido-anthraquinone carboxylic acid remains undissolved and is then obtained as a violet powder, melting above 300° C., which dissolves in pyridin to a violet solution and which is insoluble in alcohol and benzene.

My present invention is not limited to the foregoing example or to the details given therein. Thus, for instance, instead of the para-bromoanthranilic acid used in the above example another bromoanthranilic acid or a chloroanthranilic acid may be used. For the copper or the copper acetate another suitable agent of a so-called catalytic function may be substituted. Furthermore I can make use of any other substance of a kind adapted to absorb the hydrochloric acid formed during the reaction, and of any suitable solvent.

Having now described my invention and in what manner it may be performed what I claim is,—

1. As new articles of manufacture the new halogenized alpha-anilido-anthraquinone carboxylic acids possessing the general formula:

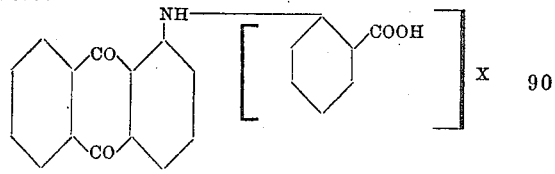

in which formula X signifies a halogen, which new bodies can be obtained by the action of alpha-chloro-anthraquinone upon a halogenized anthranilic acid in the presence of a substance capable of absorbing the hydrochloric acid formed and of a body of a so-called catalytic function, and which new halogenized carboxylic acids by the action of a dehydrating agent are converted into a halogenized anthraquinone acridon, these new bodies being violet powders, insoluble in alcohol and benzene but soluble in pyridin and possessing a high melting point.

2. As a new article of manufacture the new bromo-alpha-anilido-anthraquinone carboxylic acid possessing the following formula:

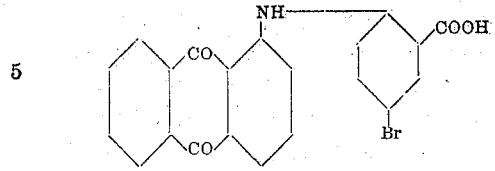

which can be obtained by acting with alpha-chloroanthraquinone upon bromo-anthranilic acid (NH$_2$:COOH:Br=1:2:4)

and which new body forms a violet powder melting above 300° C. and insoluble in alcohol and benzene but soluble in pyridin to a violet solution, and which new brominated carboxylic acid by the action of a dehydrating agent is converted into the corresponding bromo-anthraquinone acridon.

In testimony whereof I have hereunto set my hand in presence of two subscribing witnesses.

FRITZ ULLMANN.

Witnesses:
 HENRY HASPER,
 WOLDEMAR HAUPT.